United States Patent
Spangler et al.

(10) Patent No.: US 10,323,525 B2
(45) Date of Patent: Jun. 18, 2019

(54) GAS TURBINE ENGINE COMPONENT COOLING WITH RESUPPLY OF COOLING PASSAGE

(71) Applicant: United Technologies Corporation, Farmington, CT (US)

(72) Inventors: Brandon W. Spangler, Vernon, CT (US); Dominic J. Mongillo, Jr., West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 445 days.

(21) Appl. No.: 14/903,467

(22) PCT Filed: Jun. 17, 2014

(86) PCT No.: PCT/US2014/042732
§ 371 (c)(1),
(2) Date: Jan. 7, 2016

(87) PCT Pub. No.: WO2015/006026
PCT Pub. Date: Jan. 15, 2015

(65) Prior Publication Data
US 2016/0376896 A1    Dec. 29, 2016

Related U.S. Application Data

(60) Provisional application No. 61/845,481, filed on Jul. 12, 2013.

(51) Int. Cl.
*F01D 5/18* (2006.01)
*F01D 9/04* (2006.01)
(Continued)

(52) U.S. Cl.
CPC .............. *F01D 5/187* (2013.01); *F01D 9/041* (2013.01); *F01D 11/08* (2013.01); *F01D 25/12* (2013.01);
(Continued)

(58) Field of Classification Search
CPC .......... F01D 5/141; F01D 5/186; F01D 5/187; F01D 9/041; F01D 11/08; F01D 25/12;
(Continued)

(56) References Cited

U.S. PATENT DOCUMENTS

| 5,383,766 A | 1/1995 | Przirembel et al. |
| 5,419,039 A | 5/1995 | Auxier et al. |

(Continued)

FOREIGN PATENT DOCUMENTS

EP    1602800    12/2005

OTHER PUBLICATIONS

Extended European Search Report for European Application No. 14823573.2 dated Jan. 30, 2017.
(Continued)

*Primary Examiner* — Carlos A Rivera
*Assistant Examiner* — Sang K Kim
(74) *Attorney, Agent, or Firm* — Carlson, Gaskey & Olds, P.C.

(57) ABSTRACT

A gas turbine engine component includes a structure having a wall that provides an exterior surface. A first cooling passage is arranged adjacent to and interiorly of the wall. A second cooling passage is arranged in the wall and provides a first fluid flow direction. A resupply channel is arranged in the wall and is fluidly interconnected to the second cooling passage. A resupply hole fluidly interconnects the first cooling passage and the resupply channel. The resupply channel is transverse relative to the second cooling passage to provide a second fluid flow direction that extends from the resupply hole to the second cooling passage.

16 Claims, 5 Drawing Sheets

(51) Int. Cl.
   *F01D 11/08*   (2006.01)
   *F01D 25/12*   (2006.01)
(52) U.S. Cl.
   CPC ...... *F05D 2220/32* (2013.01); *F05D 2230/00* (2013.01); *F05D 2230/21* (2013.01); *F05D 2240/81* (2013.01); *F05D 2260/202* (2013.01); *F05D 2260/204* (2013.01); *F05D 2260/205* (2013.01); *Y02T 50/676* (2013.01)
(58) Field of Classification Search
   CPC ............ F05D 2220/32; F05D 2230/00; F05D 2230/21; F05D 2240/81; F05D 2260/202; F05D 2260/204; F05D 2260/205
   See application file for complete search history.

(56) References Cited

U.S. PATENT DOCUMENTS

| | | | |
|---|---|---|---|
| 5,816,777 A * | 10/1998 | Hall | F01D 5/189 416/97 R |
| 7,625,180 B1 | 12/2009 | Liang | |
| 7,717,675 B1 * | 5/2010 | Liang | F01D 5/187 415/115 |
| 7,857,589 B1 * | 12/2010 | Liang | F01D 5/187 416/97 R |
| 8,109,725 B2 | 2/2012 | Abdel-Messeh et al. | |
| 8,157,527 B2 | 4/2012 | Piggush et al. | |
| 8,303,252 B2 | 11/2012 | Piggush | |
| 8,333,233 B2 | 12/2012 | Abdel-Messeh et al. | |
| 2010/0054953 A1 | 3/2010 | Piggush | |
| 2010/0281807 A1 | 11/2010 | Tibbott | |
| 2010/0284807 A1 | 11/2010 | Tibbott | |
| 2011/0016162 A1 | 1/2011 | Booth et al. | |
| 2013/0025288 A1 | 1/2013 | Cunha et al. | |

OTHER PUBLICATIONS

Internatinal Search Report for PCT/US2014/042732 dated Oct. 10, 2014.

International Preliminary Report on Patentability for PCT/US2014/042732 dated Jan. 21, 2016.

* cited by examiner

GAS TURBINE ENGINE COMPONENT COOLING WITH RESUPPLY OF COOLING PASSAGE

CROSS-REFERENCE TO RELATED APPLICATIONS

This application claims priority to U.S. Provisional Application No. 61/845,481, which was filed on Jul. 12, 2013.

BACKGROUND

This disclosure relates to a gas turbine engine components, such as airfoils. More particularly, the disclosure relates to a cooling configuration for gas turbine engine components.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Many blades and vanes, blade outer air seals, turbine platforms, and other components include internal cooling passages. Some internal cooling configurations can create undesired pressure losses. Pressure losses can reduce the cooling efficiency and reduce overall engine efficiency by requiring more cooling fluid.

SUMMARY

In one exemplary embodiment, a gas turbine engine component includes a structure having a wall that provides an exterior surface. A first cooling passage is arranged adjacent to and interiorly of the wall. A second cooling passage is arranged in the wall and provides a first fluid flow direction. A resupply channel is arranged in the wall and is fluidly interconnected to the second cooling passage. A resupply hole fluidly interconnects the first cooling passage and the resupply channel. The resupply channel is transverse relative to the second cooling passage to provide a second fluid flow direction that extends from the resupply hole to the second cooling passage.

In a further embodiment of any of the above, the second fluid flow direction extends from the resupply hole to the second cooling passage in generally the same direction as the first fluid flow direction.

In a further embodiment of any of the above, the first and second fluid flow directions are arranged at an angle relative to one another that is less than ninety degrees.

In a further embodiment of any of the above, the resupply channel includes a first leg that has a terminal end from which the resupply hole extends. A second leg fluidly interconnects the first leg to the second cooling passage. The first and second legs are canted relative to one another.

In a further embodiment of any of the above, the first leg and the second cooling passage extend in the same direction. The second leg is at the angle relative to the second cooling passage.

In a further embodiment of any of the above, the second cooling passage includes a surface that is adjacent to the first cooling passage. The resupply hole is perpendicular to the surface.

In a further embodiment of any of the above, the structure is an airfoil that extends from a platform to a tip. The exterior surface provides an exterior airfoil surface. The first fluid flow direction extends in a radial direction toward the tip.

In a further embodiment of any of the above, the wall is at least one of a pressure and suction side wall of the airfoil.

In a further embodiment of any of the above, the structure includes multiple resupply channels spaced apart from one another that are fluidly connected to the same second cooling passage.

In a further embodiment of any of the above, first and second resupply channels are arranged on opposite lateral sides of the second cooling passage.

In a further embodiment of any of the above, the structure includes multiple second cooling passages that each include multiple resupply channels. At least some of the multiple resupply channels of adjacent multiple second cooling passages are interleaved with one another.

In a further embodiment of any of the above, the structure is one of a combustor, exhaust liner, blade outer air seal, blade, vane, platform and airfoil.

In a further embodiment of any of the above, the resupply channel is configured to introduce a cooling flow to the second cooling passage at a generally equal or greater Mach number to that of the cooling flow in the second cooling passage.

In a further embodiment of any of the above, a core is arranged within the structure that includes a first core portion and is configured to provide the first cooling passage. A second core portion is spaced from the first core portion and is configured to provide the second cooling passage. The second core portion includes a longitudinal leg and a resupply leg that is transverse to and intersecting the longitudinal leg and is configured to provide the resupply channel. The resupply leg has a terminal end. A connector interconnects the terminal ends to the first core portion and is configured to provide the resupply hole.

In another exemplary embodiment, a core for use in manufacturing a gas turbine engine component includes a first core portion that is configured to provide a first cooling passage. A second core portion is spaced from the first core portion and is configured to provide a second cooling passage. The second core portion includes a longitudinal leg and a resupply leg that is transverse to and intersects the longitudinal leg. The resupply leg has a terminal end. A connector interconnects the terminal end to the first core portion.

In a further embodiment of any of the above, the second core portion includes multiple resupply legs spaced apart from one another and connected to the same longitudinal leg.

In a further embodiment of any of the above, first and second resupply legs are arranged on opposite lateral sides of the longitudinal leg.

In a further embodiment of any of the above, the structure includes multiple longitudinal legs that each include multiple resupply legs. At least some of the multiple resupply legs of the adjacent multiple longitudinal legs are interleaved with one another.

BRIEF DESCRIPTION OF THE DRAWINGS

The disclosure can be further understood by reference to the following detailed description when considered in connection with the accompanying drawings wherein.

DETAILED DESCRIPTION

Figure 1:
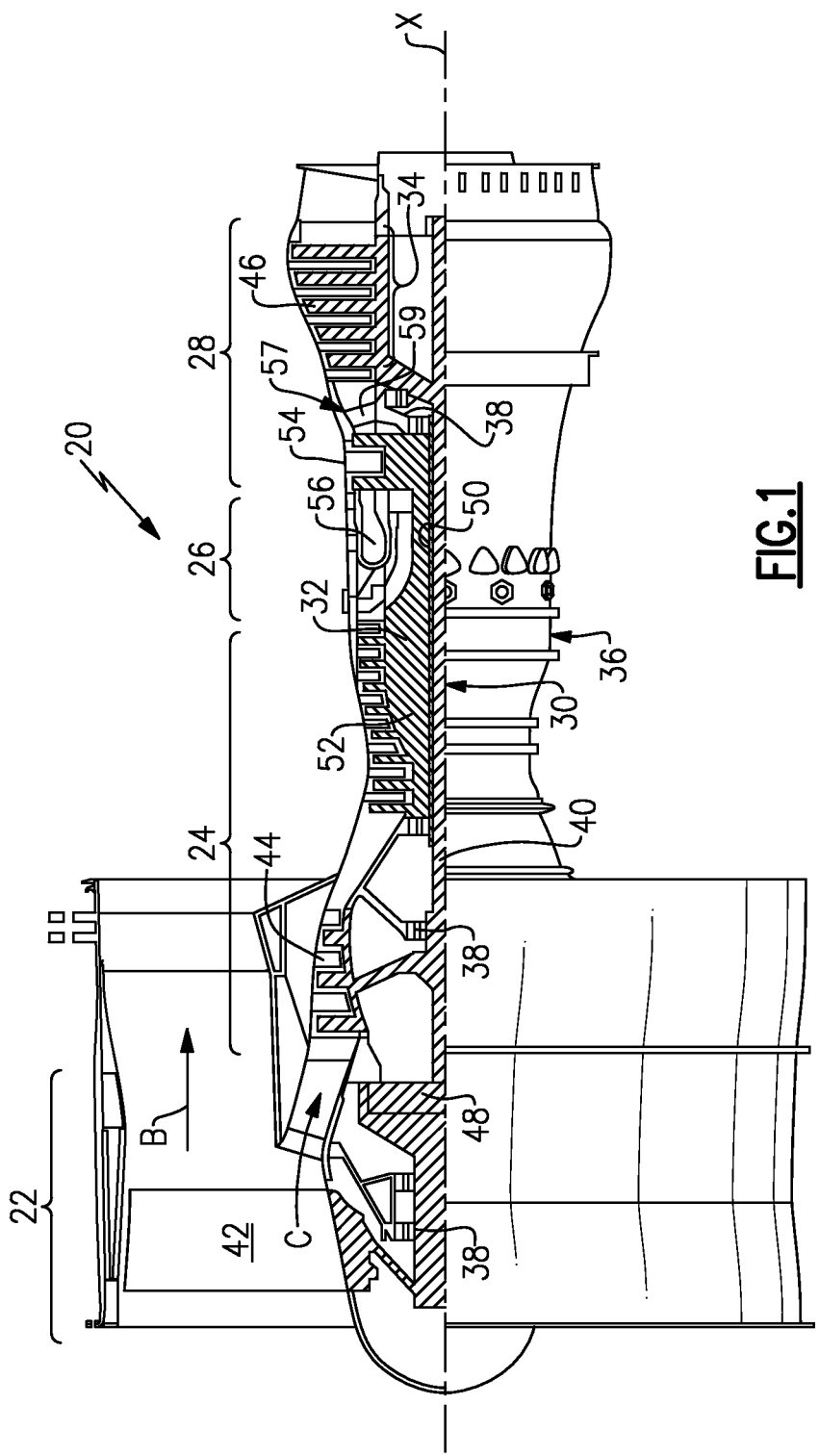
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7\ °R)]^{0.5}$. The "Low corrected fan tip speed", as disclosed herein according to one non-limiting embodiment, is less than about 1150 ft/second.

The disclosed cooling passage may be used in various gas turbine engine components. For exemplary purposes, a turbine blade 64 is described. It should be understood that the cooling passage may also be used in vanes, blade outer air seals, and turbine platforms, for example.

Figure 2A:
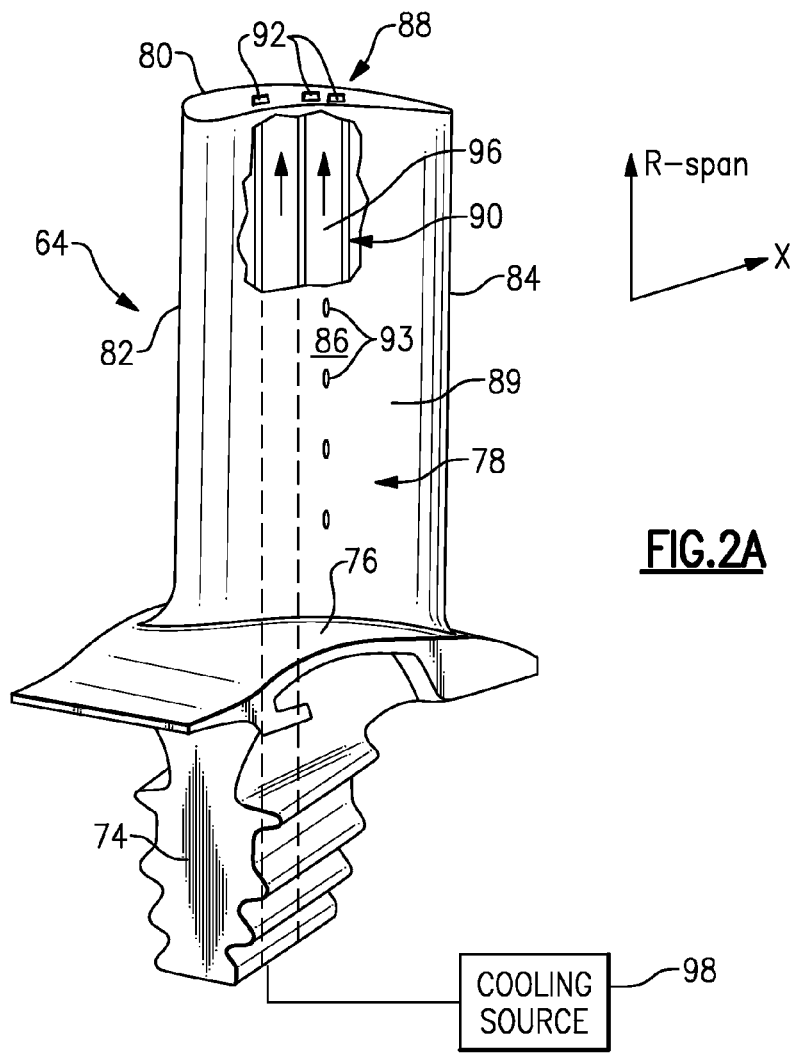
FIG. 2A is a perspective view of the airfoil having the disclosed cooling passage.
Figure 2B:
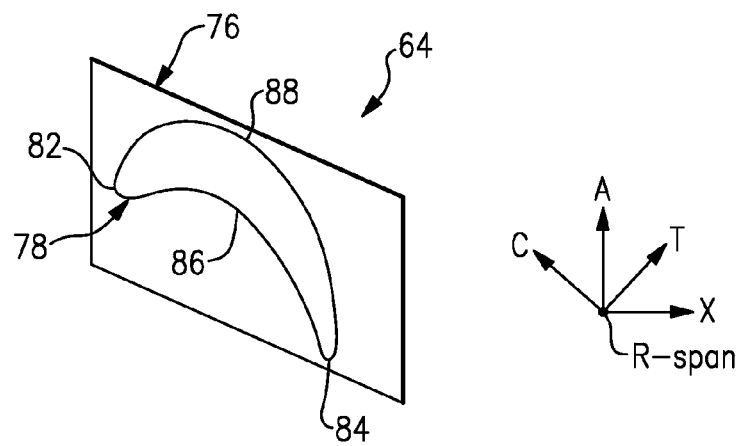
FIG. 2B is a plan view of the airfoil illustrating directional references.

Referring to FIGS. 2A and 2B, a root 74 of each turbine blade 64 is mounted to a rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates exterior airfoil surface extending in a chord-wise direction C from a leading edge 82 to a trailing edge 84. The airfoil 78 is provided between pressure (typically concave) and suction (typically convex) walls 86, 88 in an airfoil thickness direction T, which is generally perpendicular to the chord-wise direction C. Multiple turbine blades 64 are arranged circumferentially in a circumferential direction A. The airfoil 78 extends from the platform 76 in the radial direction R, or spanwise, to the tip 80.

The airfoil 78 includes cooling passages 90 provided between the pressure and suction walls 86, 88. The exterior airfoil surface 89 may include multiple film cooling holes 93 in fluid communication with the cooling passage 90. Cooling fluid is provided to the cooling passages 90 from a cooling source 98. The cooling fluid may exit the airfoil 78 through the holes 93 and/or cooling holes 92 in the tip 80. Other cooling hole configurations may be provided. Example flow through the cooling passage 90 illustrated in FIG. 2A is shown in more detail in FIGS. 3A and 3B.

Figure 3B:
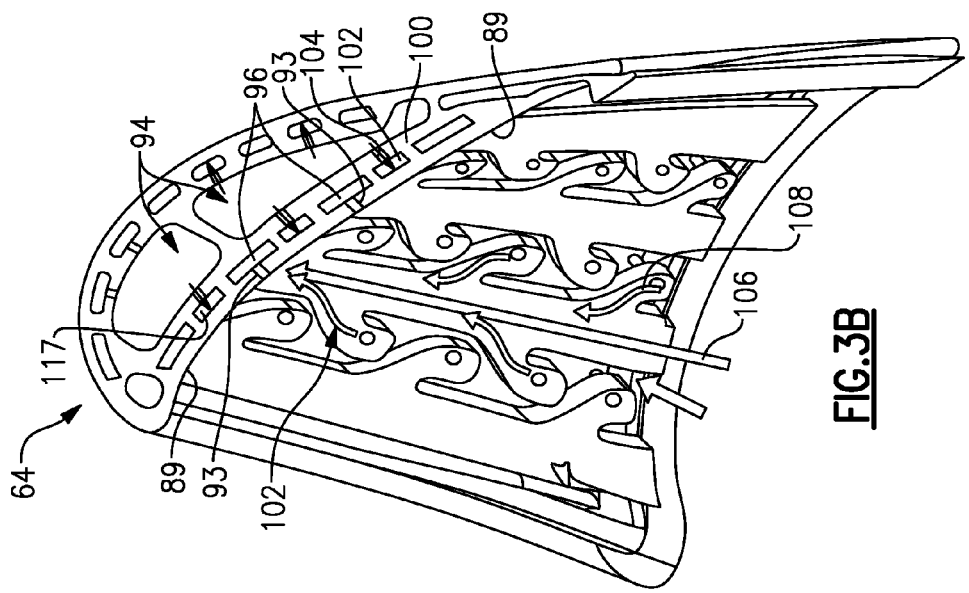
FIG. 3B is a cross-sectional perspective view through the airfoil shown in FIG. 3A taken along line 3B-3B.
Figure 3C:
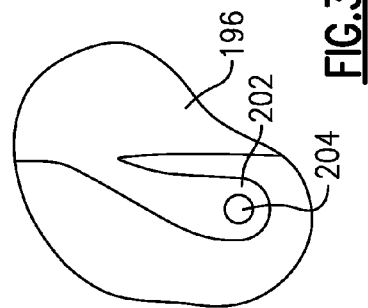
FIG. 3C is an enlarged view of a resupply channel with a resupply hole.
Figure 3A:
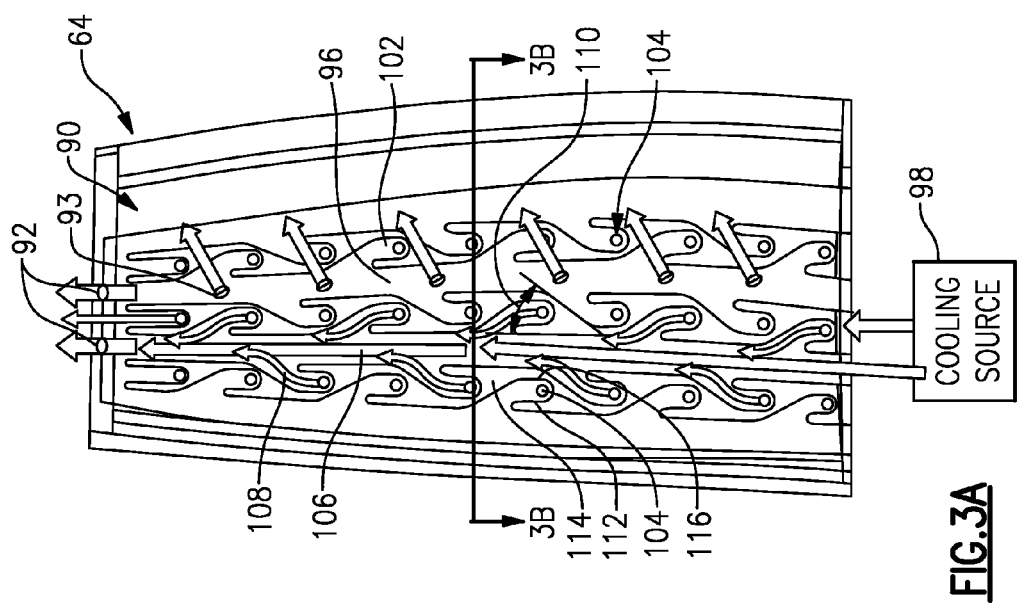
FIG. 3A is a cross-sectional view of an example airfoil taken along line 3A-3A of FIG. 4.

The example blade 64 includes first and second cooling passages 94, 96, providing the cooling passages 90, schematically shown in FIGS. 3A and 3B. In the example, the first cooling passage 94 is provided by one or more centrally located passageways that distribute the cooling fluid to other regions of the airfoil. The second cooling passage 96 is provided by one or more passageways in closer proximity to the exterior surface 89 than the first cooling passage 94. Both the first and second cooling passages 94, 96 receive cooling fluid directly and/or indirectly from the cooling source 98 (FIG. 2A).

The first cooling passage 94 is arranged adjacent to and interiorly of a wall 100. The wall 100 provides the exterior surface 89. The second cooling passage 96 extends longitudinally within the wall 100 and provides a first fluid flow direction 106. A resupply channel 102 is arranged in the wall and is fluidly interconnected to the second cooling passage 96. A resupply hole 104 fluidly interconnects the first cooling passage 94 and the resupply channel 102. The resupply channel 102 is transverse relative to the second cooling passage 96 to provide a second fluid flow direction 108 that extends from the resupply hole 104 to the second cooling passage 96.

The shape of the resupply hole 104 may be round, cylindrical shapes as well as other shapes. For example, non-circular cross-sections (e.g., resupply hole 204 in FIG. 3C) and/or conical shapes can be created using conventional core manufacturing methods and/or in conjunction with other various additive manufacturing methods described here in. Resupply hole shapes may be further optimized to reduce internal pressure loss and/or addresses local structural considerations and high concentrated stresses that may be present at the various resupply locations.

In the example shown, the second fluid flow direction 108 extends from the resupply hole 104 to the second cooling passage 96 in generally the same direction as the first fluid flow direction 106, and not in opposite directions. As the cooling fluid travels from the platform to the tip, the fluid heats up and the pressure begins to drop. The resupply holes 104 replenish the second cooling passage 96 with cooling fluid to keep temperatures down and pressures up, and the configuration of the resupply channels 102 ensures that disturbances are not introduced to the second cooling passage 96.

The first and second fluid flow directions 106, 108 are arranged at an angle 110 relative to one another that is less than 90 degrees. In this manner, the fluid from the resupply channel 102 can develop and reach a Mach number that is generally equal to or greater than the Mach number of fluid flow in the second cooling passage 96. As a result, pressure losses are minimized as the fluid from the resupply channel 102 is introduced to the second cooling passage 96.

The resupply channel 102 may be any suitable shape. In one example, the resupply channel 102 includes a first leg 112 having a terminal end 116 from which the resupply hole 104 extends. A second leg 114 adjoins and is fluidly interconnected with the first leg 112 and the second cooling passage 96. The first and second legs 112, 114 are canted relative to one another to improve packaging of the resupply channel 102. In one example, the first leg 112 extends in the same direction as the second cooling passage 96. The second leg 114 is at the angle 110 relative to the second cooling passage 96. As shown in FIG. 3B, the resupply channel 102 includes a surface 117 adjacent to the first cooling passage 94. The resupply hole 104 is generally perpendicular to the surface 117.

Although the resupply channel 102 may be designed to have a constant cross sectional flow area along its length, it may be desirable to converge the flow area of the resupply channel along its length, for example, as shown by resupply channel 202 in FIG. 3C. The convergence of the resupply channel flow area produces an increase in the velocity of the coolant mass flow relative to flow of the second cooling passage 196 thereby providing a jet pump effect which minimizes the momentum mixing loss at the location where the resupply channel 202 and second cooling passage 196 coolant flows coalesce. Additionally the higher velocity of the local coolant mass flow produces an increase in the local internal convective heat transfer resulting in improved thermal performance and cooling effectiveness.

The reduction of internal pressure loss due to the mixing of the two different fluid streams of the resupply channel 202 and second cooling passage 196 cooling cavity flows is especially desirable in film cooled high heat load design applications. By minimizing the internal pressure loss in the cooling channels a positive pressure ratio across the film cooling holes emanating from the second cooling passage 196 can be maintained. This, in turn, ensures that an effective boundary layer is produced by the film coolant ejected from the film cooling holes 93 onto the exterior airfoil surface 89 (FIG. 3B) in order to mitigate locally high external heat load and reduce local metal temperatures to meet airfoil life requirements.

Referring to FIG. 3A, the blade 64 includes multiple second cooling passages 96 spaced apart from one another. Each second cooling passage 96 includes multiple resupply channels 102 that are staggered along the length of the second cooling passage 96. In one example, the resupply channels 102 are arranged on opposite lateral sides of the second cooling passage 96. At least some of the resupply channels 102 of adjacent second cooling passages 96 are interleaved with one another to enable a greater number of cooling passages to be packaged within a particular region.

The disclosed cooling arrangement may be located on the pressure and/or suction sides 86, 88 of the blade 64. In the example illustrated in FIGS. 3A and 3B, the second passage 96 extends in a radial direction from the platform 76 to the tip 80. The second cooling passage and its adjoining resupply channel may be arranged in other directions, for example, chord-wise or axial directions. Moreover, it should be understood that the cooling configuration may be used in any gas turbine engine component.

Figure 5:
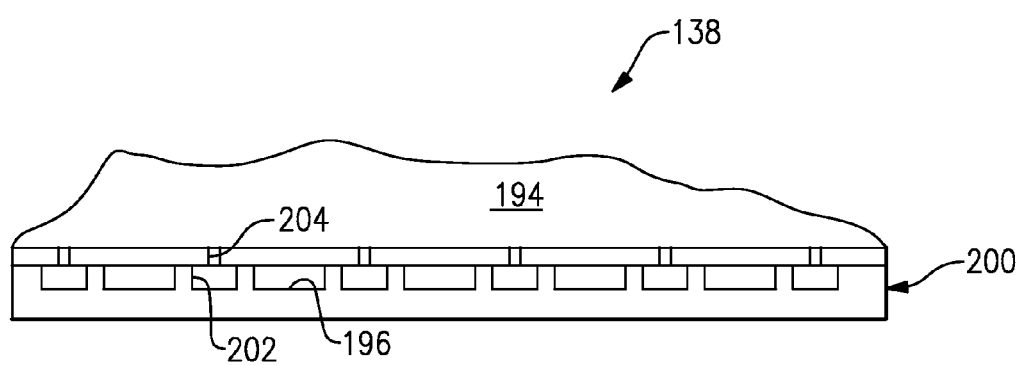
FIG. 5 is a schematic view of a structure including the cooling passage configuration shown in FIG. 3A.

For example, another example gas turbine engine component structure 138, for example, a combustor, exhaust liner, blade outer air seal, blade, vane, platform and/or airfoil, is shown in FIG. 5. The structure 138 includes a first cooling passage 194 in fluid communication with a second cooling passage 196 via the resupply holes 204. The second cooling passage 196 is in fluid communication with the resupply channel 202 as discussed above with respect to FIG. 3A.

Figure 4:
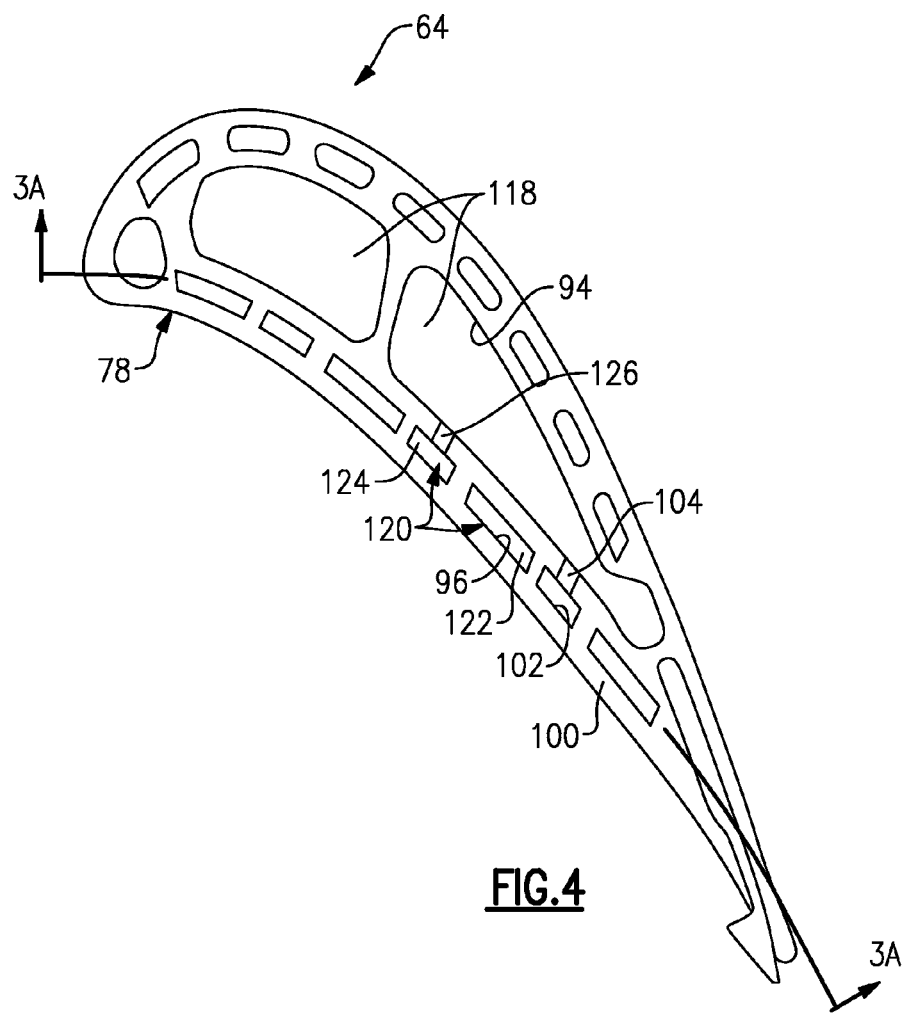
FIG. 4 is a cross-sectional end view of the airfoil shown in FIG. 3A taken along line 3B-3B with the core portions arranged within the airfoil.

The gas turbine engine component may be constructed using one or more cores. Referring to FIG. 4, a first core portion 118 is configured to provide the first cooling passage 94. A second core portion 120 is spaced from the first core portion 118. The second core portion 120 includes a longitudinal leg 122 and a resupply leg 124 that respectively are configured to provide the second cooling passage 96 and the resupply channel 102. The longitudinal leg 122 and resupply leg 124 intersect one another. The resupply leg 124 has a terminal end that corresponds to the terminal end 116 of the resupply channel 102. Connectors 126, or core ties, interconnect the resupply leg 124 to the first core portion 118. The connectors 126 are configured to provide the resupply holes 104.

Figure 7:
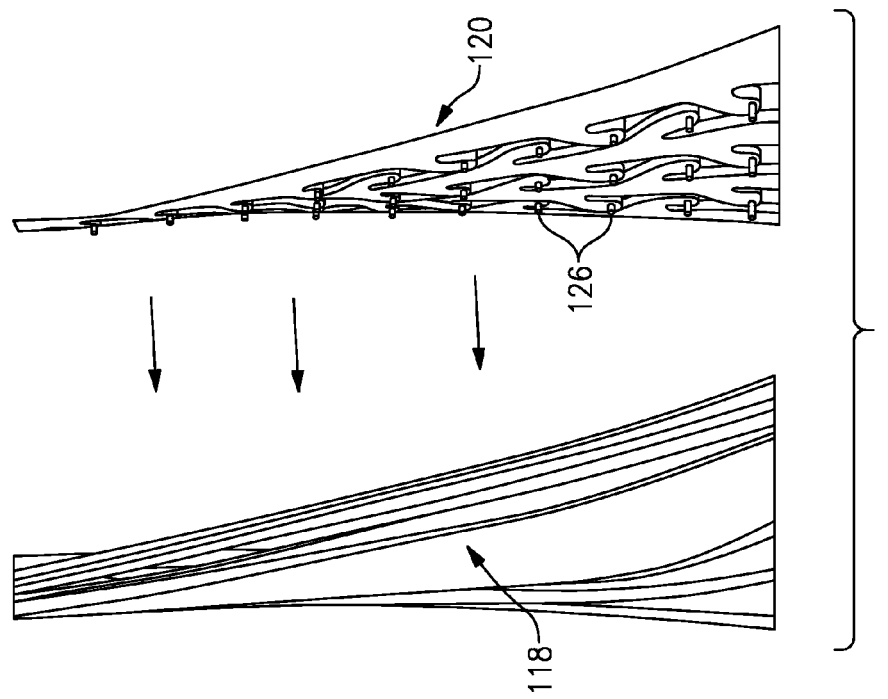
FIG. 7 is another example core manufacturing method.

The gas turbine engine component, such as the disclosed blade, may be manufactured using various methods. In one example, ceramic cores may provide the first core portion 118, and refractory metal cores may provide the second core portion 120, as shown in FIG. 7. The first and second core portions 118, 120 are assembled relative to one another using the connectors 126. The assembled core portions are inserted into a mold and surrounded by wax, which provides the structure of the gas turbine engine component subsequent to casting. The wax is coated with ceramic slurry to form a mold. Material is poured into the hardened ceramic slurry mold, replacing the wax with the cast structure, as is typical in an investment casting process.

Figure 6:
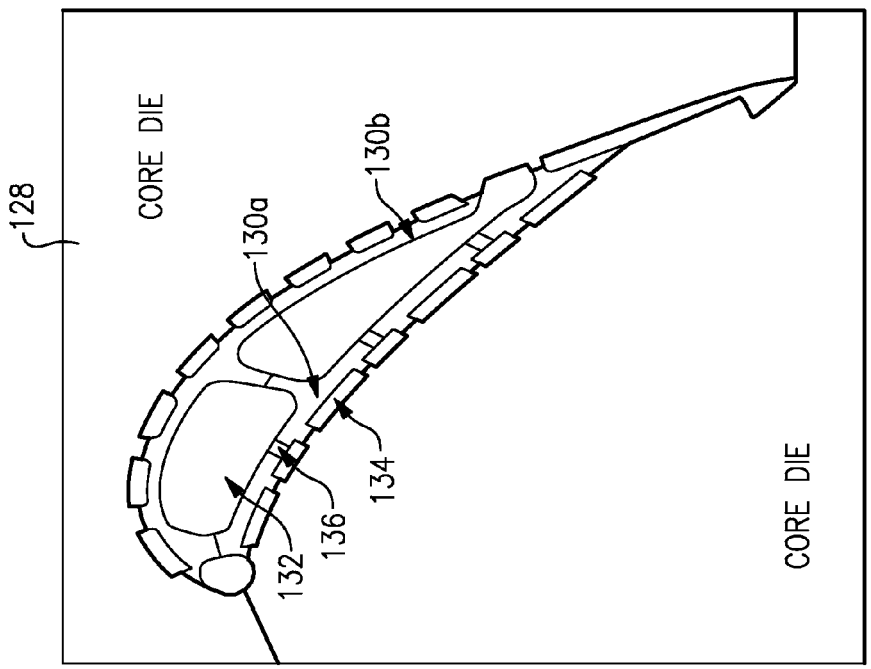
FIG. 6 is one example core manufacturing method.

An alternative method of manufacturing is schematically illustrated in FIG. 6. Plastic molds 130a, 130b are secured to one another in the example. The shape of the plastic mold 130a, 130b corresponds to at least a portion of the finished component geometry. The plastic mold 130a, 130b is arranged within a die 128. First and second core portions 132, 134 and connectors 136 are injected into the die 128 using a material, which may be an injectable ceramic material. The assembly is placed in a mold and coated in wax. The wax is coated by a ceramic slurry, as described above. The wax and plastic mold portions 130a, 130b are melted during investment casting process and replaced with cast structure.

An additive manufacturing process may also be used. Powdered metal suitable for refractory metal core applications, such as molybdenum, is fed to a machine, which may provide a vacuum, for example. The machine deposits multiple layers of powdered metal onto one another. The layers are joined to one another with reference to CAD data, which relates to a particular cross-section of the core. In one example, the powdered metal may be melted using a direct metal laser sintering process or an electron-beam melting process. With the layers built upon one another and joined to one another cross-section by cross-section, a core with the above-described geometries may be produce. A single piece core can be produced that requires no assembly and can be directly placed into a mold after being coated with wax. Alternatively, the gas turbine engine component may be formed directly using the additive manufacturing process.

Although example embodiments have been disclosed, a worker of ordinary skill in this art would recognize that certain modifications would come within the scope of the claims. For that and other reasons, the following claims should be studied to determine their true scope and content.

What is claimed is:

1. A gas turbine engine component comprising:
a structure having a wall that provides an exterior surface, a first cooling passage arranged adjacent to and interiorly of the wall, a second cooling passage arranged in the wall providing a first fluid flow direction, a resupply channel arranged in the wall fluidly interconnected to the second cooling passage, a resupply hole fluidly interconnecting the first cooling passage and the resupply channel, and wherein the resupply channel is transverse relative to the second cooling passage to provide a second fluid flow direction that extends from the resupply hole to the second cooling passage, wherein the first and second fluid flow directions are arranged at an angle relative to one another that is less than ninety degrees, wherein the structure includes multiple resupply channels spaced apart from one another and fluidly connected to the same second cooling passage.

2. The gas turbine engine component according to claim 1, wherein the second fluid flow direction extends from the resupply hole to the second cooling passage in generally the same direction as the first fluid flow direction.

3. The gas turbine engine component according to claim 1, wherein the resupply channel includes a first leg having a terminal end from which the resupply hole extends, and a second leg fluidly interconnects the first leg to the second cooling passage, the first and second legs canted relative to one another.

4. The gas turbine engine component according to claim 3, wherein the first leg and the second cooling passage extend in the same direction, and the second leg is at the angle relative to the second cooling passage.

5. The gas turbine engine component according to claim 1, wherein the structure is an airfoil extending from a platform to a tip, and the exterior surface provides an exterior airfoil surface, the first fluid flow direction extending in a radial direction toward the tip.

6. The gas turbine engine component according to claim 5, wherein the wall is at least one of a pressure and suction side wall of the airfoil.

7. The gas turbine engine component according to claim 1, wherein first and second resupply channels are arranged on opposite lateral sides of the second cooling passage.

8. The gas turbine engine component according to claim 1, wherein the structure includes multiple second cooling passages each including multiple resupply channels, at least some of the multiple resupply channels of adjacent multiple second cooling passages interleaved with one another.

9. The gas turbine engine component according to claim 1, wherein the structure is one of a combustor, exhaust liner, blade outer air seal, blade, vane, platform and airfoil.

10. The gas turbine engine component according to claim 1, wherein the resupply channel is configured to introduce a cooling flow to second cooling passage at a generally equal or greater Mach number to that of cooling flow in the second cooling passage.

11. The gas turbine engine component according to claim 1, wherein the resupply channel converges along the second fluid flow direction and is configured to increase a velocity of a cooling flow from the resupply channel to the second cooling passage.

12. A gas turbine engine component comprising:
a structure having a wall that provides an exterior surface, a first cooling passage arranged adjacent to and interiorly of the wall, a second cooling passage arranged in the wall providing a first fluid flow direction, a resupply channel arranged in the wall fluidly interconnected to the second cooling passage, a resupply hole fluidly interconnecting the first cooling passage and the resupply channel, and wherein the resupply channel is transverse relative to the second cooling passage to provide a second fluid flow direction that extends from the resupply hole to the second cooling passage, wherein the first and second fluid flow directions are arranged at an angle relative to one another that is less than ninety degrees, wherein the second cooling passage includes a surface adjacent to the first cooling passage, the resupply hole perpendicular to the surface.

13. A gas turbine engine component comprising:
a structure having a wall that provides an exterior surface, a first cooling passage arranged adjacent to and interiorly of the wall, a second cooling passage arranged in the wall providing a first fluid flow direction, a resupply channel arranged in the wall fluidly interconnected to the second cooling passage, a resupply hole fluidly interconnecting the first cooling passage and the resupply channel, the resupply channel providing a second fluid flow direction that extends from the resupply hole to the second cooling passage, wherein the resupply channel includes a first leg having a terminal end from which the resupply hole extends, and a second leg fluidly interconnects the first leg to the second cooling passage, the first and second legs canted relative to one another; and
wherein the structure is an airfoil, the wall extending in a chord-wise direction from a leading edge to a trailing edge, the wall extending radially from a platform to a tip, wherein the airfoil includes multiple resupply channels feeding a same one of the second cooling passage, the multiple resupply channels spaced apart from one another in the chord-wise direction and the radial direction.

14. The gas turbine engine component according to claim 13, wherein the second fluid flow direction extends from the resupply hole to the second cooling passage in generally the same direction as the first fluid flow direction.

15. The gas turbine engine component according to claim 14, wherein the first and second fluid flow directions are arranged at an angle relative to one another that is less than ninety degrees.

16. The gas turbine engine component according to claim 13, wherein the first leg and the second cooling passage extend in the same direction, and the second leg is at the angle relative to the second cooling passage.

* * * * *